(12) United States Patent
Lee et al.

(10) Patent No.: US 7,314,783 B2
(45) Date of Patent: Jan. 1, 2008

(54) METHOD OF FABRICATING CONTACT LINE OF LIQUID CRYSTAL DISPLAY DEVICE

(75) Inventors: Dong Hoon Lee, Kyonggi-do (KR); Kwon Shik Park, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/603,929

(22) Filed: Jun. 26, 2003

(65) Prior Publication Data
US 2004/0051837 A1    Mar. 18, 2004

(30) Foreign Application Priority Data
Aug. 23, 2002    (KR)    ............ 10-2002-0050053

(51) Int. Cl.
*H01L 21/00*    (2006.01)

(52) U.S. Cl. .................. 438/149; 438/156; 438/157; 257/E27.112

(58) Field of Classification Search ............ 438/149, 438/156–157; 349/152
See application file for complete search history.

(56) References Cited

U.S. PATENT DOCUMENTS

| | | | |
|---|---|---|---|
| 5,978,058 A * | 11/1999 | Sung | 349/139 |
| 6,268,289 B1 * | 7/2001 | Chowdhury et al. | 438/687 |
| 6,714,266 B1 * | 3/2004 | Ueda et al. | 349/38 |
| 2002/0004108 A1 * | 1/2002 | Iwakabe et al. | 428/1.1 |

* cited by examiner

*Primary Examiner*—Thanh Nguyen
(74) *Attorney, Agent, or Firm*—McKenna, Long & Aldridge LLP (57) ABSTRACT

A contact line structure for a liquid crystal display device includes a metal line on an array substrate, a silicide layer on the metal line, an insulating layer having a contact hole exposing a first portion of the silicide layer, and a transparent conducting terminal in and on the contact hole, wherein the insulating layer is adjacent to the contact hole.

14 Claims, 10 Drawing Sheets

METHOD OF FABRICATING CONTACT LINE OF LIQUID CRYSTAL DISPLAY DEVICE

The present invention claims the benefit of the Korean Patent Application No. P2002-50053 filed in Korea on Aug. 23, 2002, which is hereby incorporated by reference.

BACKGROUND OF THE INVENTION

1. Field of the Invention

The present invention relates to a display device and a method of fabricating a display device, and more particularly, to a liquid crystal display device and a method of fabricating a liquid crystal display device.

2. Discussion of the Related Art

Advancements within information communication fields have increased the demand for various types of display devices. In response to this demand, various flat panel display devices, such as liquid crystal display (LCD) devices, plasma display panel (PDP) devices, electro-luminescent display (ELD) devices, and vacuum fluorescent display (VFD) devices, have been developed to replace conventional cathode ray tube (CRT) devices. In particular, the LCD devices are commonly used because of their high resolution, light weight, thin profile, and low power consumption. In addition, the LCD devices have been implemented in mobile devices, such as monitors for notebook computers, and have been developed for monitors of computers and televisions. Accordingly, efforts to improve image quality of LCD devices have contrasted with the benefits of high resolution, light weight, thin profile, and low power consumption. In order to incorporate the LCD devices in general image display devices, image quality, such as fineness, brightness, and large-size, must be realized.

In general, the LCD device includes an LCD panel for displaying an image thereupon, and a driving part for supplying a driving signal to the LCD panel. The LCD panel includes lower and upper substrates bonded together having a fixed interval therebetween, and a liquid crystal material layer that is injected between the lower and upper substrates. The lower substrate (i.e., TFT array substrate) includes a plurality of gate lines arranged along a first direction spaced apart by fixed intervals, a plurality of data lines arranged along a second direction perpendicular to the first direction spaced apart by fixed intervals to define a plurality of pixel regions, a plurality of pixel electrodes within each of the pixel regions defined by crossings of the plurality of gate and data lines, and a plurality of thin film transistors that are individually enabled according to a signal supplied by the gate line for transmitting a signal supplied by the data line to the pixel electrode. The upper substrate (i.e., color filter substrate) includes a black matrix film provided on regions of the second substrate for preventing light leakage, except within the pixel regions of the first substrate, and R/G/B color filter layers for displaying colors, and a common electrode, which together with the pixel electrode, display image data.

During a fabrication process, a predetermined interval is maintained between the lower and upper substrates using spacers to define a cell gap, and the lower and upper substrates are bonded to each other by a sealant material provided along a periphery of the first and second substrates. Then, liquid crystal material is injected into the cell gap formed between the lower and upper substrates through an inlet port of the sealant material. As a result of the fabrication process, a plurality of LCD panels are formed on one substrate according to overall sizes of the substrates and the LCD panel.

Figure 1:
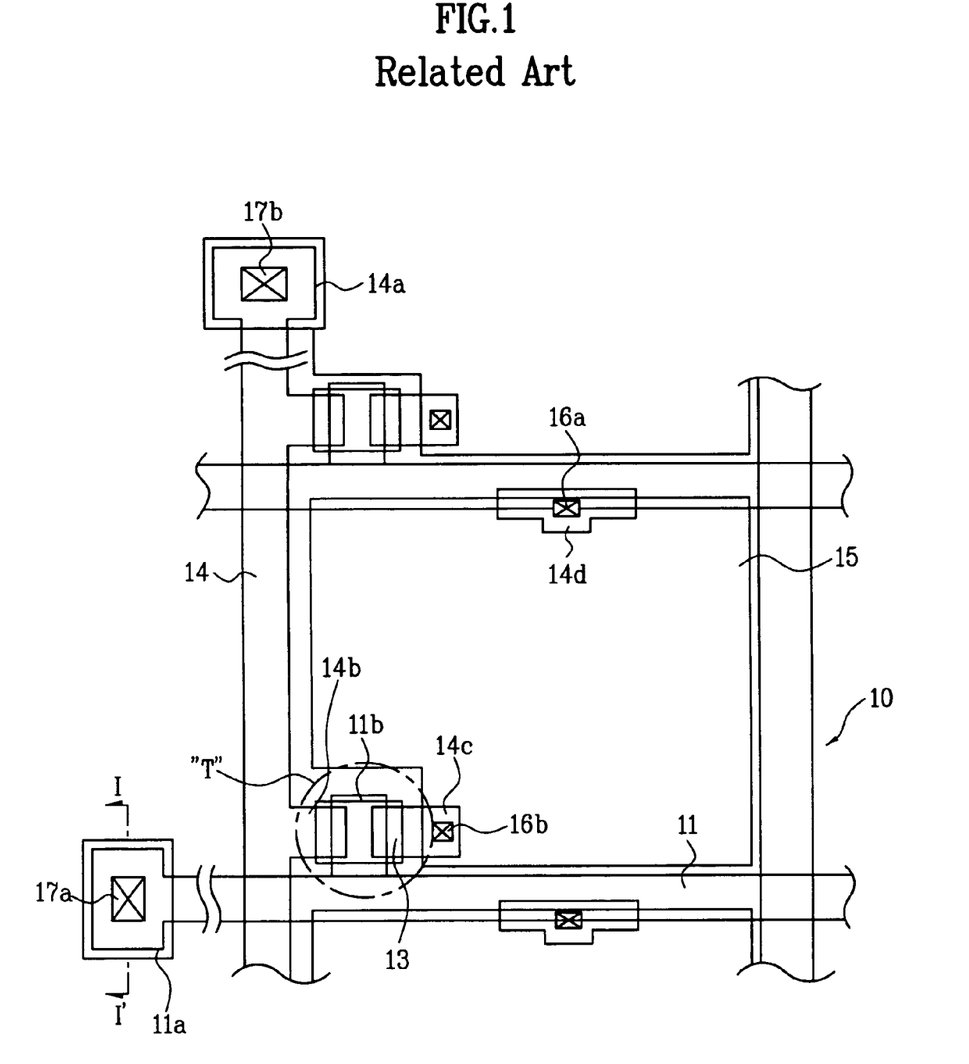
FIG. 1 is a plan view of a pixel region of an array substrate according to the related art.

FIG. 1 is a plan view of a pixel region of an array substrate according to the related art. In FIG. 1, a plurality of gate lines 11 are formed on a transparent substrate at fixed intervals, a gate electrode 11b is formed to extend from each of the gate lines 11, a storage lower electrode is formed adjacent to one of the gate lines, and a gate pad 11a is formed at one end of each of the gate lines 11. In addition, a gate insulating layer (not shown) is formed on the transparent substrate including the gate line 11, the gate electrode 11b, and the storage lower electrode, and an active layer 13 is formed on the gate insulating layer above the gate electrode 11b, wherein the active layer 13 includes a silicon layer and a doped silicon layer.

Next, a plurality of data lines 14 are formed perpendicular to the gate lines 11, thereby defining a plurality of pixel regions, and a data pad 14a is formed at one end of each of the data lines 14. In addition, a source electrode 14b is formed to extend from each of the data lines 14 to overlap a first side of the active layer 13, a drain electrode 14c is formed apart from the source electrode 14b to overlap a second side of the active layer 13, and a storage upper electrode 14d is formed above the storage upper electrode during formation of the drain electrode 14c.

Next, a passivation layer (not shown) is formed on an entire surface of the transparent substrate, and includes first and second contact holes 16a and 16b corresponding to the storage upper electrode 14d and the drain electrode 14c, respectively, and third and fourth contact holes 17a and 17b corresponding to the gate pad 11a and the data pad 14a, respectively. The passivation layer is formed of one material of an organic insulating group containing Benzocyclobutene (BCB) or a photoacrylic resin. A pixel electrode 15 is formed on the pixel region of the passivation layer to connect to the drain electrode 14c and the storage upper electrode 14d through the first and second contact holes 16a and 16b. Then, gate and data pad terminals 18a and 18b are formed on the third and fourth contact holes 17a and 17b, respectively, such that the passivation layer is adjacent to the third and fourth contact holes 17a and 17b. The gate and data pad terminals 18a and 18b are formed of a transparent conductive layer similar to the material used to form the pixel electrode.

Figure 2:
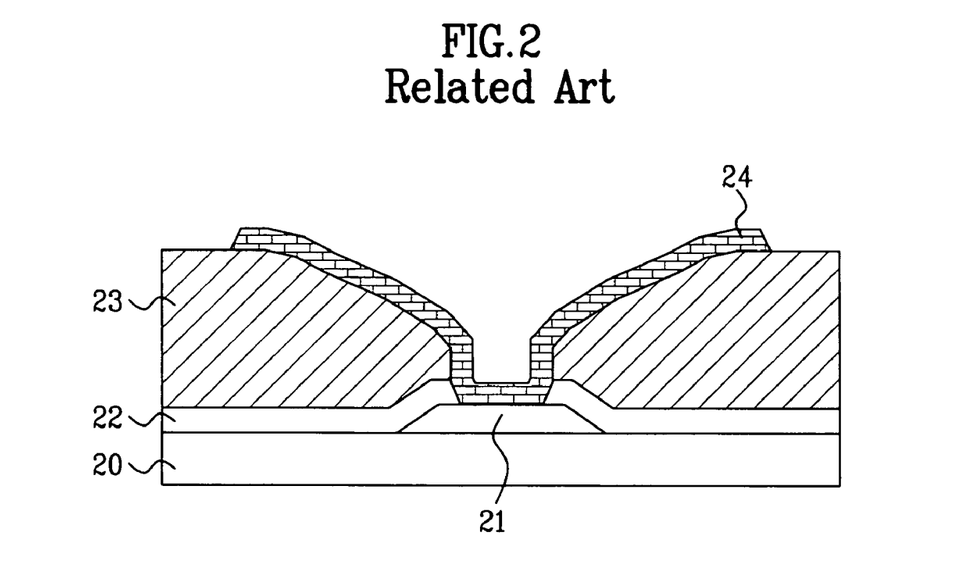
FIG. 2 is a cross sectional view along I-I' of FIG. 1 according to the related art.

FIG. 2 is a cross sectional view along I-I' of FIG. 1 according to the related art. In FIG. 2, a metal pad 21, such as the gate or data pad, is formed on a predetermined region of the transparent substrate 20, wherein the metal pad 21 is formed of a conductive metal material. Then, an inorganic insulating layer 22 is formed on the transparent substrate 20 including the metal pad 21 using the same material as the gate insulating layer (not shown). In addition, an organic insulating layer 23 is formed on the inorganic insulating layer 22 using the same material as the passivation layer (not shown). Subsequently, the organic insulating layer 23 and the inorganic insulating layer 22 are selectively etched to expose a predetermined region of the metal pad 21, thereby forming a contact hole. A pad terminal 24 is formed on the contact hole such that the organic insulating layer 23 is adjacent to the contact hole. Accordingly, the pad terminal 24 is formed of a transparent conductive oxide (TOC), and the metal pad 21 directly contacts the pad terminal 24.

In FIG. 2, a conductive metal, such as aluminum Al, molybdenum Mo, tungsten W or a conductive metal alloy, is deposited on the transparent substrate 20, and patterned. Accordingly, the gate line (not shown) extends from the metal pad 21, the gate electrode (not shown) protrudes from the gate line, and a storage capacitor region of an adjacent gate line serves as the storage lower electrode.

Next, an insulating material, such as a silicon dioxide $SiO_2$ or a silicon nitride $SiN_X$, is deposited on an entire surface of the transparent substrate 20 including the gate line (not shown) to form an inorganic insulating layer 22. Accordingly, the inorganic insulating layer 22 serves as the gate insulating layer. After that, the organic insulating layer 23 is deposited on the inorganic insulating layer 22 including the metal pad 21. The transparent conductive oxide (TOC) is deposited on the entire surface of the organic insulating layer 23 including the contact hole, and is selectively patterned to form the pad terminal 24 on the contact hole such that the organic insulating layer 23 is adjacent to the contact hole. As a result, the metal pad 21 directly contacts the pad terminal 24.

However, impurities may be deposited on the metal pad 21 when forming the metal pad 21 to directly contact the pad terminal 24. For example, carbon or oxygen elements from the organic insulating layer 23 and fluorine elements from an etching gas may be deposited on the metal pad 21 during the process for forming the contact hole by etching the organic insulating layer 23 to from the contact hole. Accordingly, these elements increase contact resistance.

Figure 3:
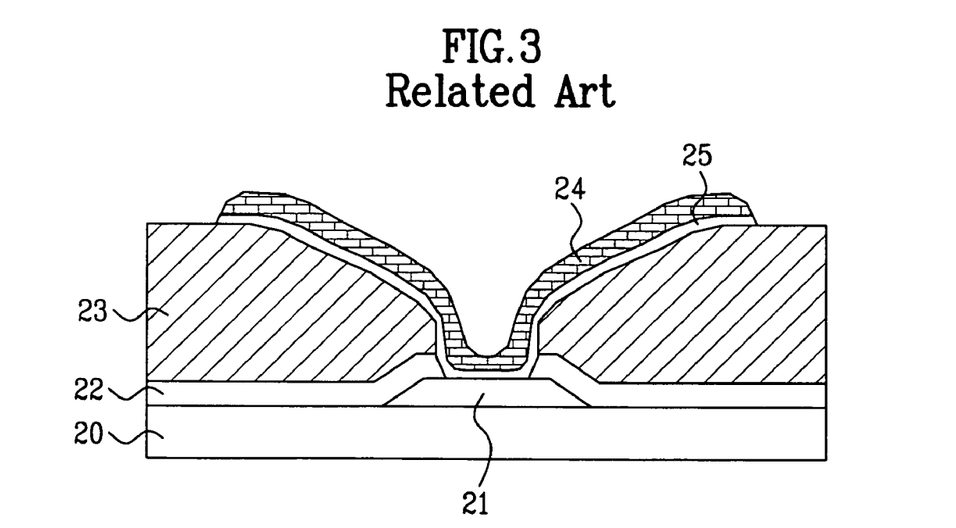
FIG. 3 is a cross sectional view along I-I' of FIG. 1 according to the related art.

FIG. 3 is a cross sectional view along I-I' of FIG. 1 according to the related art. In FIG. 3, a contact line includes a barrier layer 25 formed underneath the pad terminal 24, wherein the barrier layer 25 is formed of the same material as the metal pad 21. In addition, use of the barrier layer 25 may be incorporated into a contact portion between the data pad terminal and the data pad at one end of the data line, a contact portion between the storage upper electrode and the pixel electrode, and a contact portion between the drain electrode and the pixel electrode, as well as a contact portion between the gate pad terminal and the gate pad at one end of the gate line. However, an additional masking process is required to form the barrier layer 25, thereby complicating the fabrication process, and increasing fabrication costs. Similarly, in FIG. 2, impurities from the organic insulating layer and etching gas may be deposited on the metal pad during the process of forming the contact hole, thereby increasing contact resistance and deteriorating picture quality.

SUMMARY OF THE INVENTION

Accordingly, the present invention is directed to a contact line of a liquid crystal display device and method of fabricating a contact line of a liquid crystal display device that substantially obviates one or more problems due to limitations and disadvantages of the related art.

An object of the present invention is to provide a contact line of a liquid crystal display device that prevents deterioration of picture quality.

An object of the present invention is to provide a method of fabricating a contact line of a liquid crystal display device that prevents deterioration of picture quality.

Another object of the present invention is to provide a contact line of a liquid crystal display device that has a decreased contact resistance.

Another object of the present invention is to provide a method of fabricating a contact line of a liquid crystal display device that decreases contact resistance without increasing processing steps.

Additional features and advantages of the invention will be set forth in the description which follows, and in part will be apparent from the description, or may be learned by practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a contact line structure for a liquid crystal display device includes a metal line on an array substrate, a silicide layer on the metal line, an insulating layer having a contact hole exposing a first portion of the silicide layer, and a transparent conducting terminal in and on the contact hole, wherein the insulating layer is adjacent to the contact hole.

In another aspect, a method of fabricating a contact line structure for a liquid crystal display device includes forming a metal line on an array substrate, forming a silicide layer on at least a first portion of the metal line, forming an insulating layer having a contact hole exposing a first portion of the silicide layer, and forming a transparent conducting terminal in and on the contact hole, wherein the insulating layer is adjacent to the contact hole.

In another aspect, a method of fabricating a contact line structure of a liquid crystal display device includes forming a metal line on a first portion of an array substrate, forming an insulating layer having a contact hole for exposing a first portion of the metal line, forming a silicide layer on the first portion of the metal line exposed by the contact hole, and forming a transparent conducting terminal in and on the contact hole, wherein the insulating layer is adjacent to the contact hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 9A to 9D are cross sectional views of another exemplary process of fabricating a contact line of a liquid crystal display device according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 4:
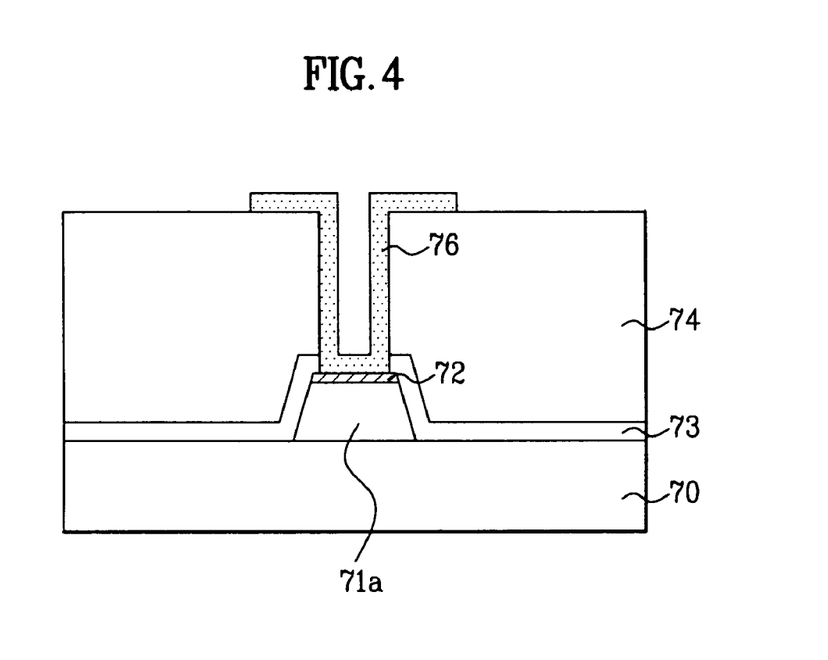
FIG. 4 is a cross sectional view of an exemplary contact line of a liquid crystal display device according to the present invention.

FIG. 4 is a cross sectional view of an exemplary contact line of a liquid crystal display (LCD) device according to the present invention. In FIG. 4, a metal pad 71a formed of conductive metal material(s) may be formed on a predetermined region of a transparent substrate 70. For example, the metal pad 71a may have a trapezoidal shape wherein a surface of the metal pad 71a that directly contacts the transparent substrate 70 may have a width larger than a surface opposite to the transparent substrate 70. Alternatively, the metal pad 71a may have a rectangular or square shape. Next, a silicide layer 72 may be formed on an upper surface of the metal pad 71a to extend along an entire length of the upper surface of the metal pad 71a.

Subsequently, an inorganic insulating layer 73 may be formed on an entire surface of the transparent substrate 70 including the metal pad 71a, wherein the inorganic insulating layer 73 may function as a gate insulating layer. Then, an organic insulating layer 74 may be formed on the inorganic insulating layer 73, and may include one of an organic insulating material group including Benzocyclobutene (BCB) or a photoacrylic resin.

Next, the organic insulating layer 74 and the inorganic insulating layer 73 may be selectively etched to expose a first portion of the silicide layer 72, thereby forming a contact hole 75 (in FIG. 7D), wherein second portions of the silicide layer 72 remain on the upper surface of the metal pad 71a. Accordingly, the entire upper surface of the silicide layer 72 may not be exposed during the selective etching process. In addition, portions of the inorganic insulating layer 73 may exist on the second portions of the silicide layer 72.

Then, a pad terminal 76 of a transparent conducting oxide (TCO) may be formed in and on upper peripheral portions of the contact hole 75 that contact portions of the organic insulating layer 74 adjacent to the contact hole 75. Accordingly, the pad terminal 76 may not directly contact the metal pad 71a such that the pad terminal 76 may indirectly contact the metal pad 71a through the silicide layer 72.

Figure 7A:
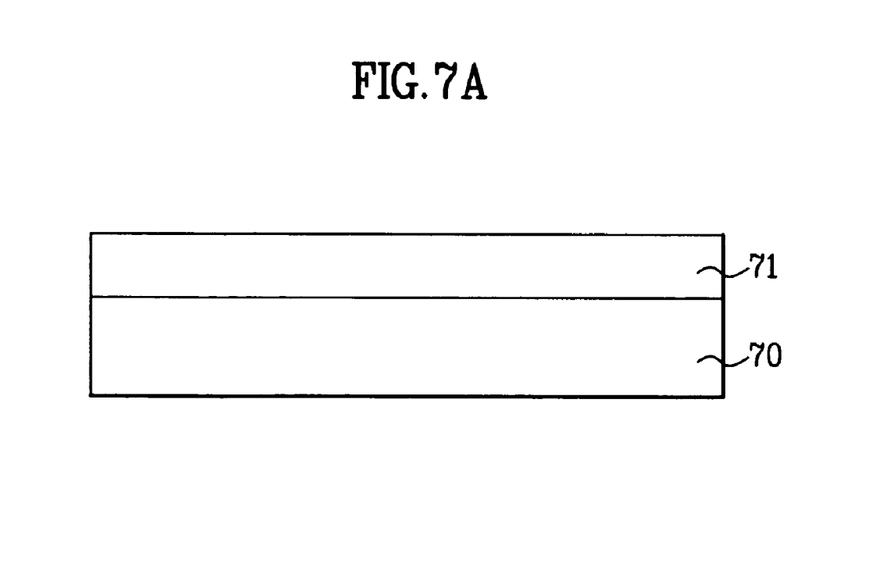
FIGS. 7A to 7E are cross sectional views of an exemplary process of fabricating a contact line of a liquid crystal display device according to the present invention.

FIGS. 7A to 7E are cross sectional views of an exemplary process of fabricating a contact line of a liquid crystal display device according to the present invention. In FIG. 7A, a conductive metal, such as chrome Cr, molybdenum Mo, tungsten W, titanium Ti, tantalum Ta or a conductive metal alloy, may be deposited on a transparent substrate 70, whereby a metal layer 71 may be formed on the transparent substrate 70. Accordingly, the metal layer 71 may be formed of material(s) suitable for formation of silicide materials.

Figure 7B:
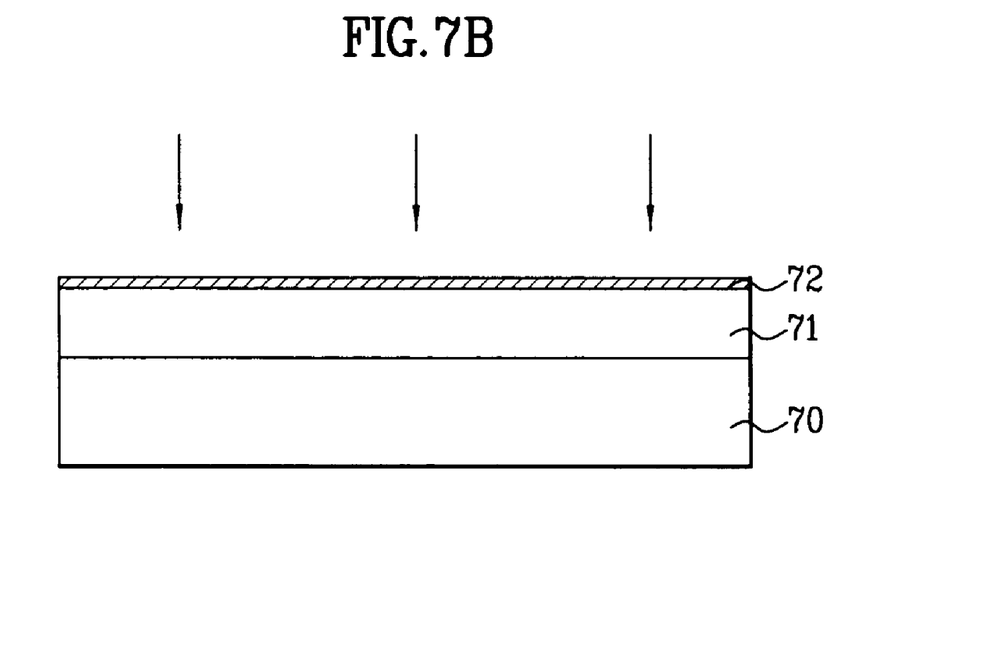

In FIG. 7B, a silicide layer 72 may be formed on an upper surface of the metal pad 71a to extend along an entire length of an upper surface of the metal pad 71a using plasma processes that include silane group gases containing silicon (Si), wherein the silane group gases may be one of $SiH_4$, $Si_2H_6$, and $Si_3H_8$. The plasma processes may be performed at a power of about 100 Watts or less, a pressure of about 110 Pa or less, a temperature of about 250° C. to about 500° C., and a gas flow of about 100 SCCM or less. At a gas flow of about 400 SCCM or less, $H_2$ is required.

Figure 7C:
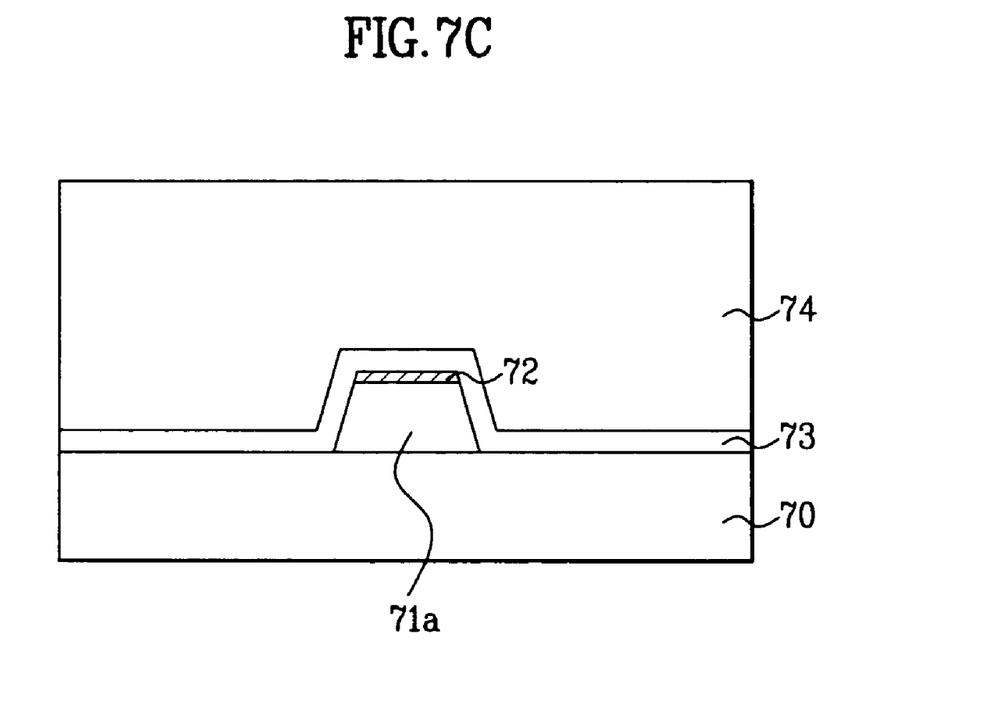

In FIG. 7C, the metal layer 71 and the silicide layer 72 may be sequentially dry-etched, thereby forming a trapezoidal shaped metal pad 71a to function as a gate pad. When forming the metal pad 71a, a gate line (not shown), which may extend from the metal pad 71, may be formed during formation of a gate electrode (not shown) that may protrude from the gate line. Accordingly, a storage capacitor region of an adjacent gate line may function as a storage lower electrode.

Next, an insulating material, such as silicon dioxide $SiO_2$ or silicon nitride $SiN_X$, may be deposited on an entire surface of the transparent substrate 70, thereby forming an inorganic insulating layer 73 that may function as a gate insulating layer. Then, an organic insulating layer 74 may be deposited on the inorganic insulating layer 73 including the metal pad 71a, and may include one of an organic insulating group containing Benzocyclobutene (BCB) or a photoacrylic resin.

Figure 7D:
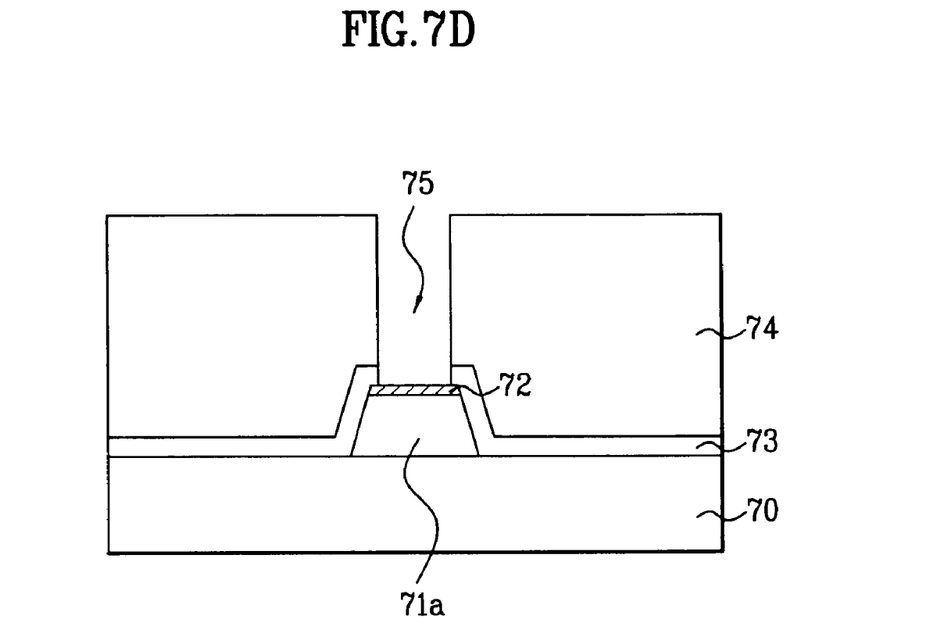

In FIG. 7D, the organic insulating layer 74 and the inorganic insulating layer 73 may be sequentially etched to expose a first portion of the silicide layer 72 disposed on the metal pad 71a, thereby forming the contact hole 75. In addition, second portions of the silicide layer 72 may remain on the upper surface of the metal pad 71a, wherein the entire upper surface of the silicide layer 72 may not be exposed during the selective etching process. In addition, portions of the inorganic insulating layer 73 may exist on the second portions of the silicide layer 72.

Figure 7E:
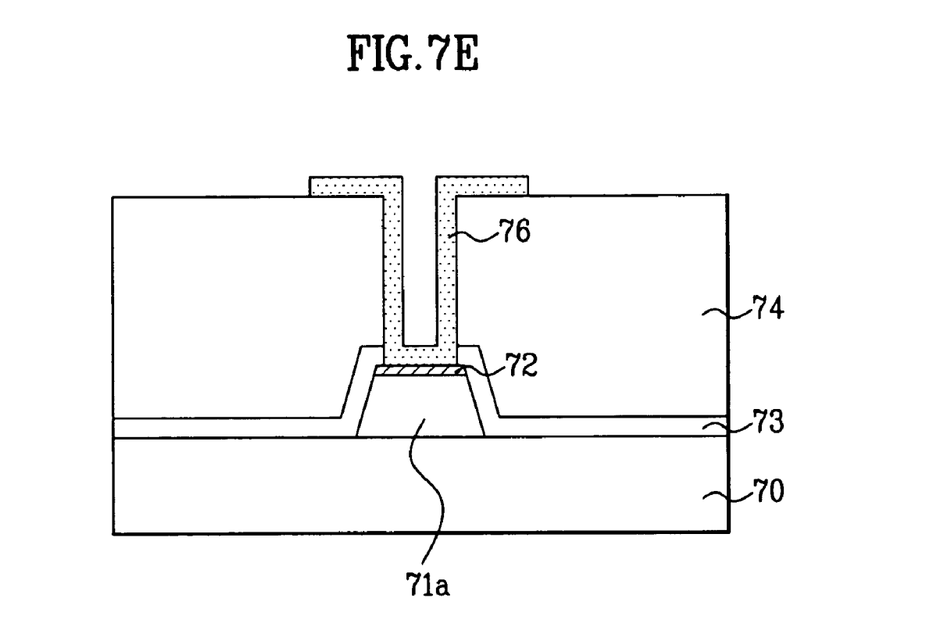

In FIG. 7E, a transparent conducting oxide (TCO) may be deposited on an entire surface of the organic insulating layer 74 including the contact hole 75, and may be selectively patterned, thereby forming a pad terminal 76 in the contact hole 75 such that the organic insulating layer 74 is adjacent to the contact hole 75. In addition, portions of the pad terminal may be provided along peripheral portions of the contact hole on adjacent portions of the organic insulating layer 74. Accordingly, the pad terminal 76 may be formed to indirectly contact the metal pad 71a through the silicide layer 72.

Although not shown, additional processes may be included between the process steps for forming the inorganic insulating layer 73 and the organic insulating layer 74. For example, an amorphous silicon material containing pure amorphous silicon (a-Si) material and impurities may be deposited on the transparent substrate 70, thereby forming a semiconductor layer that includes the amorphous silicon and impurity amorphous silicon. Then, the semiconductor layer may be selectively patterned for forming an island-shaped active layer above the gate electrode.

Next, a conductive metal, such as chrome Cr, molybdenum Mo, tungsten W, titanium Ti, tantalum Ta or a conductive metal alloy, may be deposited on an entire surface of the transparent substrate 70 including the active layer. Then, the plasma process using the silane group gas containing the silicon Si may be performed on the conductive metal for forming the silicide layer. At this time, the plasma process may be performed using the same conditions previously described above.

During the patterning process, a data line may be formed perpendicular to the gate line, a data pad may be formed at one end of the data line, and a source electrode that protrudes from the data line may be formed above the gate electrode to overlap a first side of the active layer. Accordingly, the inorganic insulating layer 73 may be interposed between the gate and data lines.

During formation of the data line, a drain electrode may be formed spaced apart from the source electrode to overlap with a second side of the active layer. Then, a storage upper electrode may be formed within a storage capacitor region of an adjacent gate line, wherein the storage capacitor region includes a storage lower electrode.

In addition, the contact line of FIG. 4, and the method of fabricating a contact line of FIGS. 7A to 7E may be applicable to a contact portion between a data pad terminal and a data pad at one end of the data line, a contact portion between the storage upper electrode and a pixel electrode, and a contact portion between the drain electrode and the pixel electrode, as well as the contact portion between a gate pad terminal and a gate pad at one end of the gate line. For example, the contact hole 75 may be simultaneously formed on the silicide layer of the data pad, the storage upper electrode, and the drain electrode. In addition, when forming the pad terminal 76, the pixel electrode within the pixel region may be formed during formation of the data pad terminal on the data pad. Accordingly, the data pad may indirectly contact the data pad terminal through the silicide layer, and the storage upper electrode and the drain electrode may indirectly contact the pixel electrode through the silicide layer.

Figure 5:
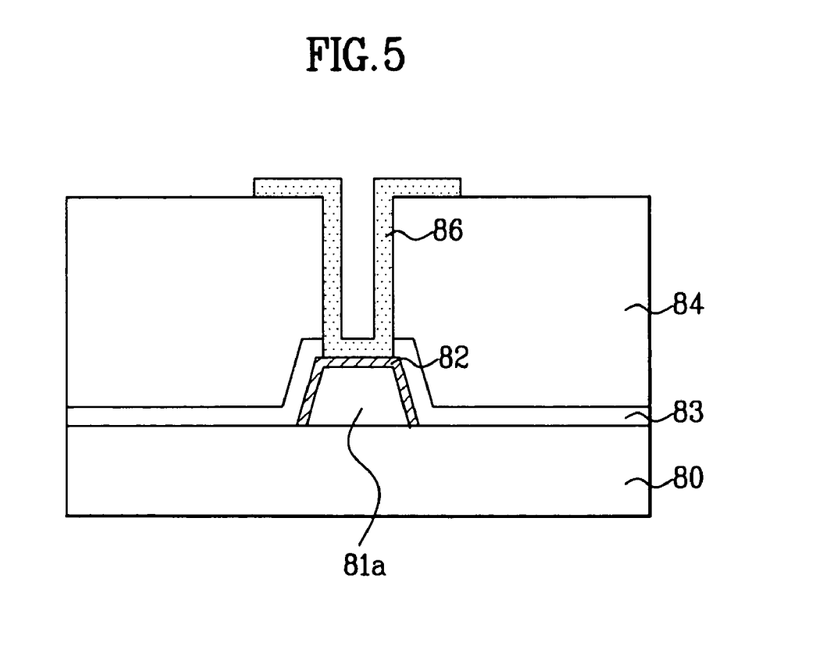
FIG. 5 is a cross sectional view of another exemplary contact line of a liquid crystal display device according to the present invention.

FIG. 5 is a cross sectional view of another exemplary contact line of a liquid crystal display device according to the present invention. In FIG. 5, a metal pad 81a formed of conductive metal material(s) may be formed on a predetermined region of a transparent substrate 80. For example, the metal pad 81a may have a trapezoidal shape wherein a surface of the metal pad 81a that directly contacts the transparent substrate 80 may have a width larger than a surface opposite to the transparent substrate 80. Alternatively, the metal pad 81a may have a rectangular or square shape. Next, a silicide layer 82 may be formed on upper and side surfaces of the metal pad 81a.

Subsequently, an inorganic insulating layer 83 may be formed on an entire surface of the transparent substrate 80 including the metal pad 81a, wherein the inorganic insulating layer 83 may functions as a gate insulating layer. Then, an organic insulating layer 84 may be formed on the inorganic insulating layer 83, and may include one of an organic insulating material group including Benzocyclobutene (BCB) or a photoacrylic resin.

Next, the organic insulating layer 84 and the inorganic insulating layer 83 may be selectively etched to expose a first portion of the silicide layer 82, thereby forming a contact hole 75 (in FIG. 7D), wherein second portions of the silicide layer 82 remain on the upper and side surfaces of the metal pad 81a. Accordingly, the entire upper surface of the silicide layer 82 may not be exposed during the selective etching process. In addition, portions of the inorganic insulating layer 83 may exist on the second portions of the silicide layer 82.

Then, a pad terminal 86 of a transparent conducting oxide (TCO) may be formed in and on upper peripheral portions of the contact hole 75 that contact portions the organic insulating layer 84 adjacent to the contact hole 75. Accordingly, the pad terminal 86 may not directly contact the metal pad 81a such that the pad terminal 86 may indirectly contact the metal pad 81a through the silicide layer 82.

Figure 8A:
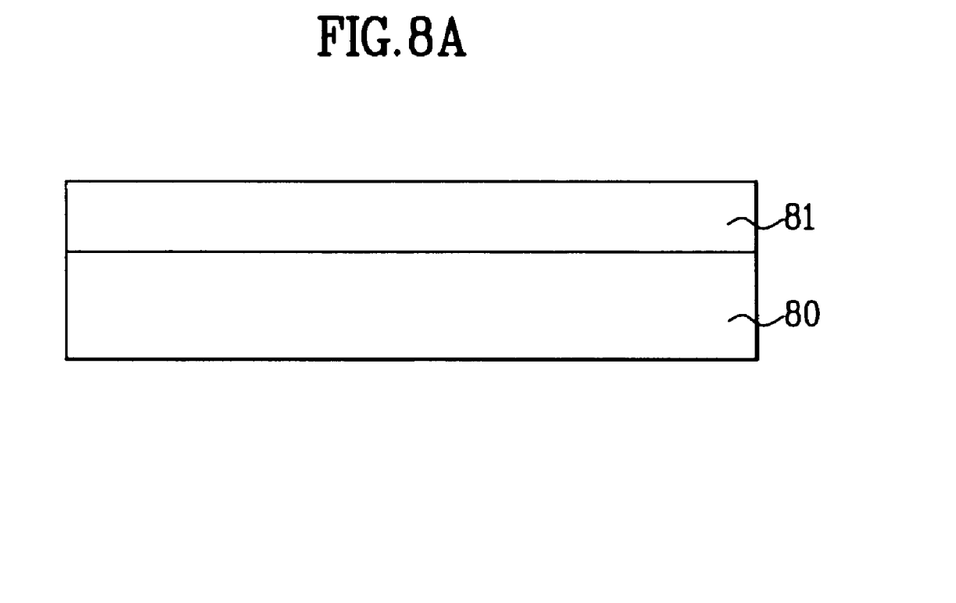
FIGS. 8A to 8E are cross sectional views of another exemplary process of fabricating a contact line of a liquid crystal display device according to the present invention.

FIGS. 8A to 8E are cross sectional views of another exemplary process of fabricating a contact line of a liquid crystal display device according to the present invention. In FIG. 8A, a conductive metal, such as chrome Cr, molybdenum Mo, tungsten W, titanium Ti, tantalum Ta or a conductive metal alloy, may be deposited on a transparent substrate 80, whereby a metal layer 81 may be formed on the transparent substrate 80. Accordingly, the metal layer 81 may be formed of material(s) suitable for formation of silicide materials.

Figure 8B:
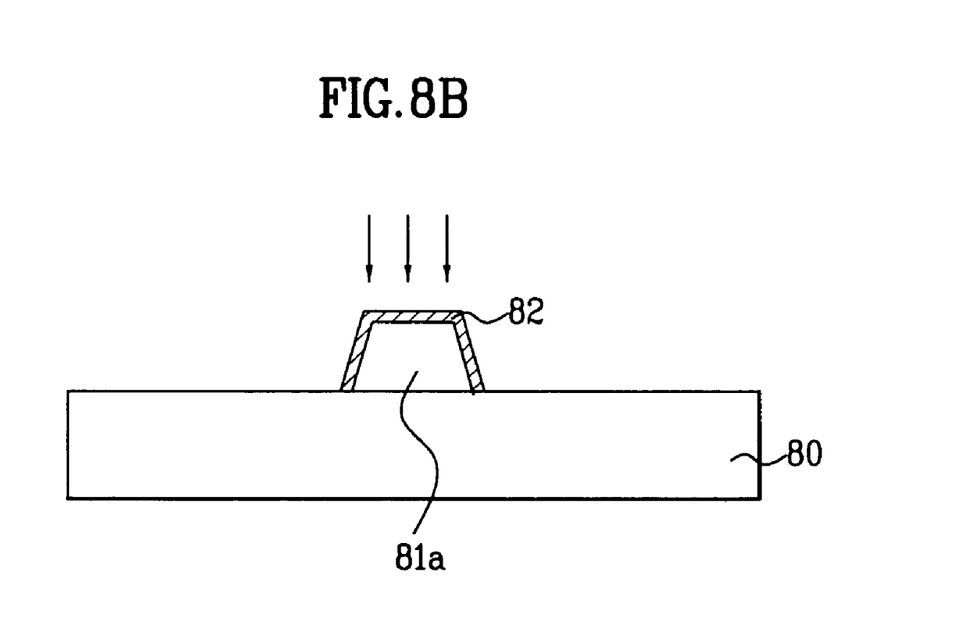

In FIG. 8B, a silicide layer 82 may be formed on upper and side surfaces of the metal pad 81a using plasma processes that include silane group gases containing silicon (Si), wherein the silane group gases may be one of $SiH_4$, $Si_2H_6$, and $Si_3H_8$. The plasma processes may be performed at a power of about 100 Watts or less, a pressure of about 100 Pa or less, a temperature of about 250° C. to about 500° C., and a gas flow of about 100 SCCM or less. At a gas flow of about 400 SCCM or less, $H_2$ is required.

Figure 8C:
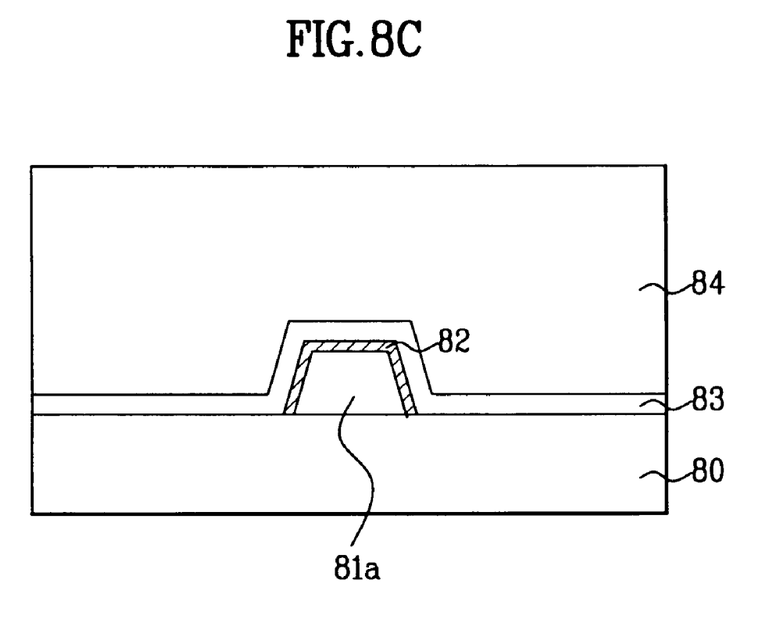

In FIG. 8C, the metal layer 81 and the silicide layer 82 may be sequentially dry-etched, thereby forming a trapezoidal shaped metal pad 81a to function as a gate pad. When forming the metal pad 81a, a gate line (not shown), which may extend from the metal pad 81, may be formed during formation of a gate electrode (not shown) that may protrude from the gate line. Accordingly, a storage capacitor region of an adjacent gate line may function as a storage lower electrode.

Next, an insulating material, such as silicon dioxide $SiO_2$ or silicon nitride $SiN_X$, may be deposited on an entire surface of the transparent substrate 80, thereby forming an inorganic insulating layer 83 that may function as a gate insulating layer. Then, an organic insulating layer 84 may be deposited on the inorganic insulating layer 83 including the metal pad 81a, and may include one of an organic insulating group containing Benzocyclobutene (BCB) or a photoacrylic resin.

Figure 8D:
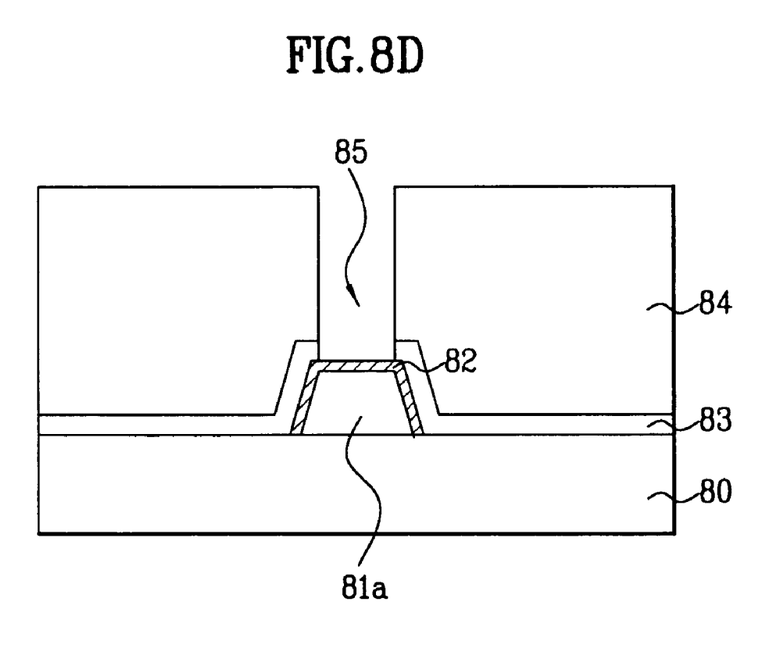

In FIG. 8D, the organic insulating layer 84 and the inorganic insulating layer 83 may be sequentially etched to expose a first portion of the silicide layer 82 disposed on an upper surface of the metal pad 81a, thereby forming the contact hole 85. In addition, second portions of the silicide layer 82 may remain on the upper surface of the metal pad 81a, wherein the entire upper surface of the silicide layer 82 may not be exposed during the selective etching process. In addition, portions of the inorganic insulating layer 83 may exist on the second portions of the silicide layer 82.

Figure 8E:
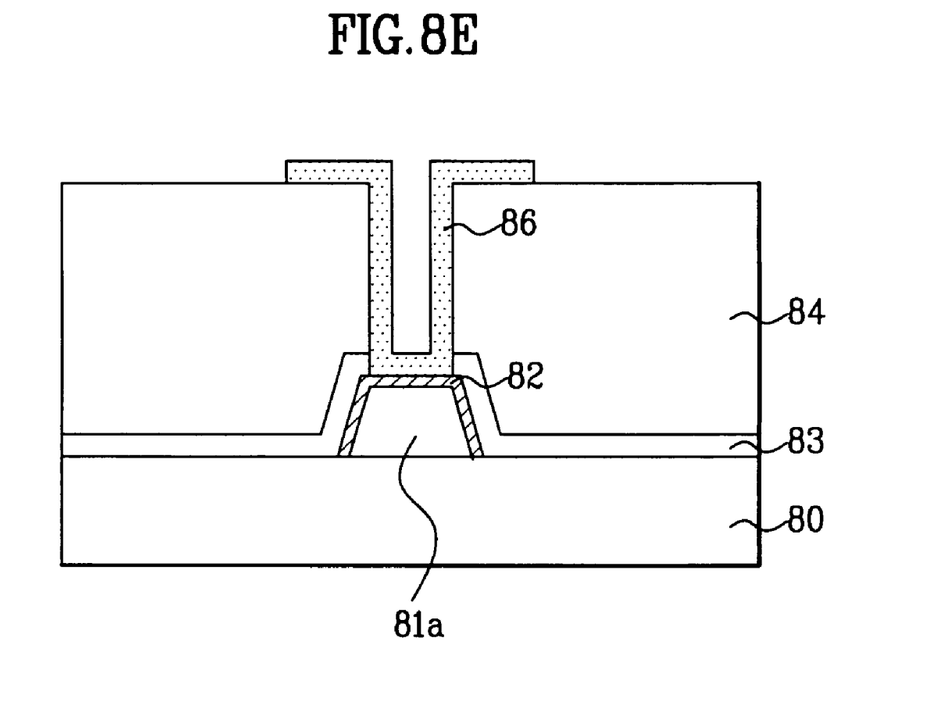

In FIG. 8E, a transparent conducting oxide (TCO) may be deposited on an entire surface of the organic insulating layer 84 including the contact hole 85, and may be selectively patterned, thereby forming a pad terminal 86 in the contact hole 85 such that the organic insulating layer 84 is adjacent to the contact hole 85. In addition, portions of the pad terminal may be provided along peripheral portions of the contact hole on adjacent portions of the organic insulating layer 84. Accordingly, the pad terminal 86 may be formed to indirectly contact the metal pad 81a through the silicide layer 82.

Although not shown, additional processes may be included between the process steps for forming the inorganic insulating layer 83 and the organic insulating layer 84. For example, an amorphous silicon material containing pure amorphous silicon (a-Si) material and impurities may be deposited on the transparent substrate 80, thereby forming a semiconductor layer that includes the amorphous silicon and impurity amorphous silicon. Then, the semiconductor layer may be selectively patterned for forming an island-shaped active layer above the gate electrode.

Next, a conductive metal, such as chrome Cr, molybdenum Mo, tungsten W, titanium Ti, tantalum Ta or a conductive metal alloy, may be deposited on an entire surface of the transparent substrate 80 including the active layer. Then, the plasma process using the silane group gas containing the silicon Si may be performed on the conductive metal for forming the silicide layer. At this time, the plasma process may be performed using the same conditions previously described above.

During the patterning process, a data line may be formed perpendicular to the gate line, a data pad may be formed at one end of the data line, and a source electrode that protrudes from the data line may be formed above the gate electrode to overlap a first side of the active layer. Accordingly, the inorganic insulating layer 83 may be interposed between the gate and data lines.

During formation of the data line, a drain electrode may be formed spaced apart from the source electrode to overlap with a second side of the active layer. Then, a storage upper electrode may be formed within a storage capacitor region of an adjacent gate line, wherein the storage capacitor region includes a storage lower electrode.

In addition, the contact line of FIG. 5, and the method of fabricating a contact line of FIGS. 8A to 8E may be applicable to a contact portion between a data pad terminal and a data pad at one end of the data line, a contact portion between the storage upper electrode and a pixel electrode, and a contact portion between the drain electrode and the pixel electrode, as well as the contact portion between a gate pad terminal and a gate pad at one end of the gate line. For example, the contact hole 85 may be simultaneously formed on the silicide layer of the data pad, the storage upper electrode, and the drain electrode. In addition, when forming the pad terminal 86, the pixel electrode within the pixel region may be formed during formation of the data pad terminal on the data pad. Accordingly, the data pad may indirectly contact the data pad terminal through the silicide layer, and the storage upper electrode and the drain electrode may indirectly contact the pixel electrode through the silicide layer.

Figure 6:
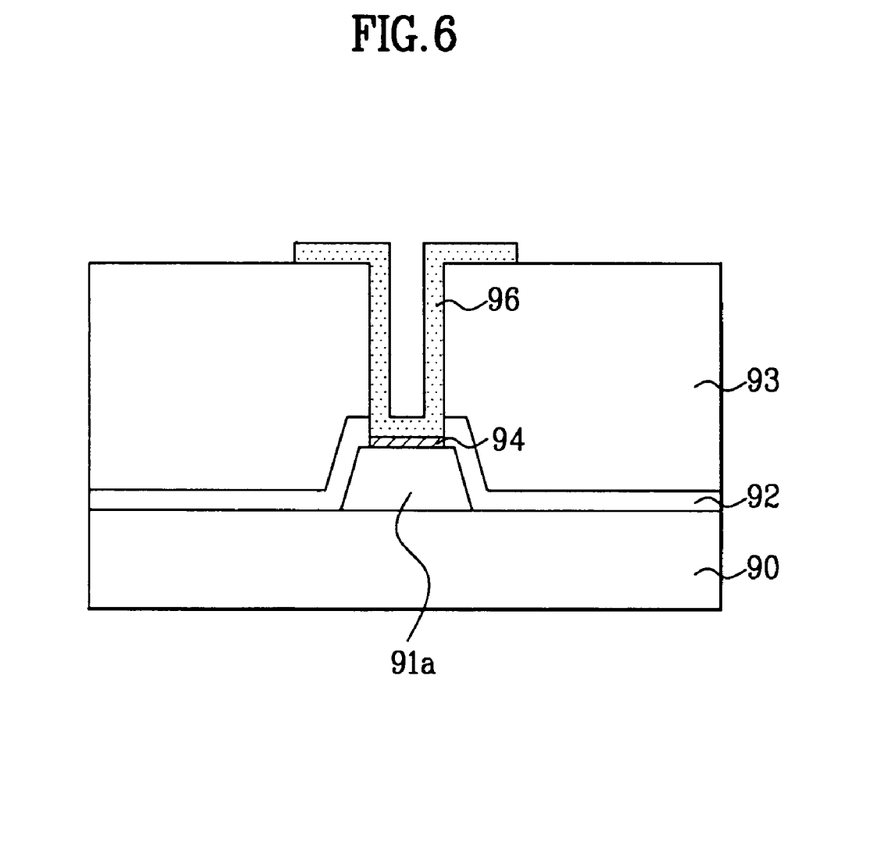
FIG. 6 is a cross sectional view of another exemplary contact line of a liquid crystal display device according to the present invention.

FIG. 6 is a cross sectional view of another exemplary contact line of a liquid crystal display device according to the present invention. In FIG. 6, a metal pad 91a formed of conductive metal material(s) may be formed on a predetermined region of a transparent substrate 90. For example, the metal pad 91a may have a trapezoidal shape wherein a surface of the metal pad 91a that directly contacts the transparent substrate 90 may have a width larger than a surface opposite to the transparent substrate 90. Alternatively, the metal pad 91a may have a rectangular or square shape.

Subsequently, an inorganic insulating layer 92 may be formed on an entire surface of the transparent substrate 90 including the metal pad 91a, wherein the inorganic insulating layer 92 may function as a gate insulating layer. Then, an organic insulating layer 93 may be formed on the inorganic insulating layer 92, and may include one of an organic insulating material group including Benzocyclobutene (BCB) or a photoacrylic resin.

Figure 9A:
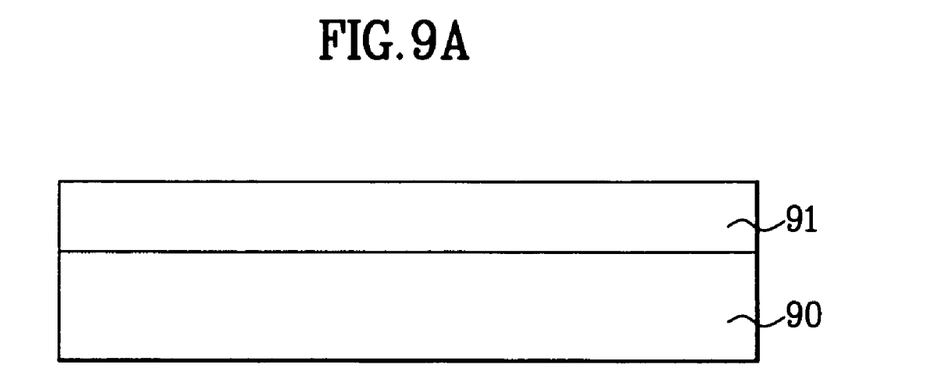
Figure 9B:
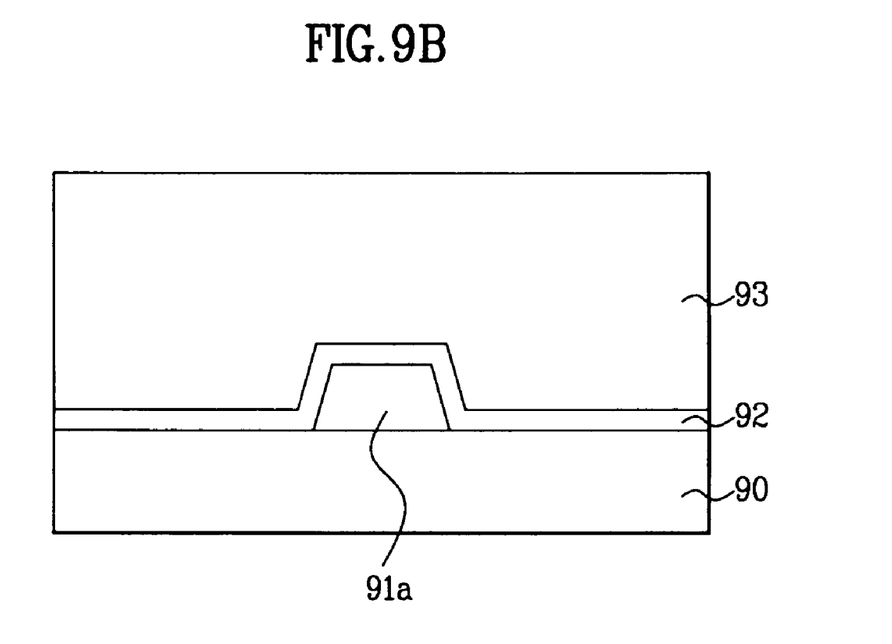
Figure 9C:
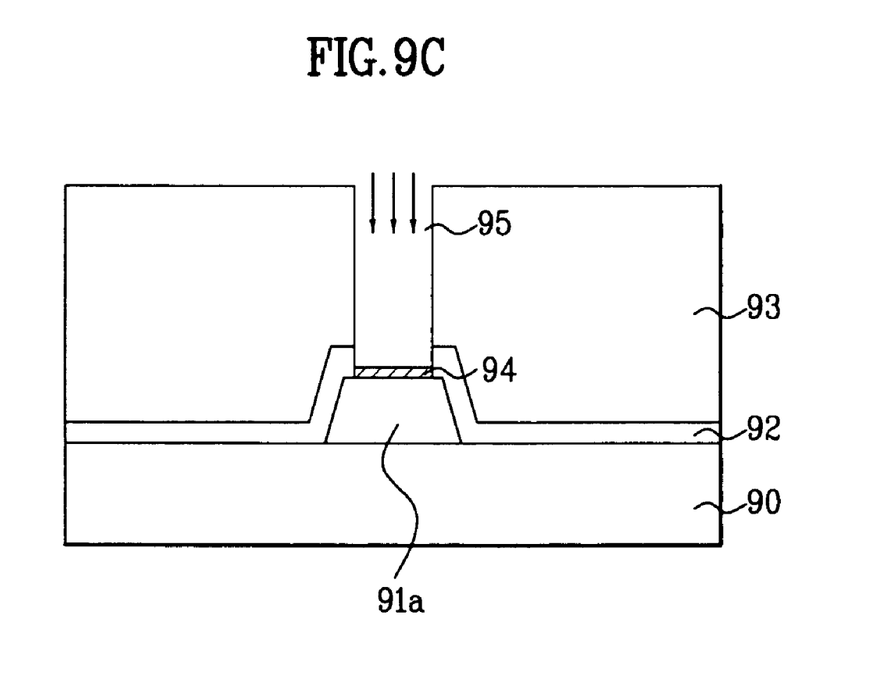

Next, the organic insulating layer 93 and the inorganic insulating layer 92 may be selectively etched to expose a first portion of the metal pad 91a, thereby forming a contact hole 95 (in FIG. 9C). Then, a silicide layer 94 may be formed on the first portion of the metal pad 91a, wherein portions second portions of the metal pad 91a may not have the silicide layer 94. Accordingly, portions of the inorganic insulating layer 92 may exist on the second portions of the metal pad 91a.

Then, although not shown, a pad terminal of a transparent conducting oxide (TCO) may be formed in and on upper peripheral portions of the contact hole 95 that contact portions the organic insulating layer 93 adjacent to the contact hole 95. Accordingly, the pad terminal may not directly contact the metal pad 91a such that the pad terminal may indirectly contact the metal pad 91a through the silicide layer 94.

FIGS. 9A to 9D are cross sectional views of another exemplary process of fabricating a contact line of a liquid crystal display device according to the present invention. In FIG. 9A, a conductive metal, such as chrome Cr, molybdenum Mo, tungsten W, titanium Ti, tantalum Ta or a conductive metal alloy, may be deposited on a transparent substrate 90, whereby a metal layer 91 may be formed on the transparent substrate 90. Accordingly, the metal layer 91 may be formed of material(s) suitable for formation of silicide materials.

Next, as shown in FIG. 9B, the metal layer 91 may be dry-etched, thereby forming a trapezoidal shaped metal pad 91a to function as a gate pad. When forming the metal pad 91a, a gate line (not shown), which may extend from the metal pad 91, may be formed during formation of a gate electrode (not shown) that may protrude from the gate line. Accordingly, a storage capacitor region of an adjacent gate line may function as a storage lower electrode.

Next, an insulating material, such as silicon dioxide $SiO_2$ or silicon nitride $SiN_x$, may be deposited on an entire surface of the transparent substrate 90, thereby forming an inorganic insulating layer 92 that may function as a gate insulating layer. Then, an organic insulating layer 93 may be deposited on the inorganic insulating layer 92 including the metal pad 91a, and may include one of an organic insulating group containing Benzocyclobutene (BCB) or a photoacrylic resin.

In FIG. 9C, the organic insulating layer 92 and the inorganic insulating layer 93 may be sequentially etched to expose a first portion of the metal pad 91a, thereby forming the contact hole 95. In addition, second portions of the metal pad 91a may remain covered by portions of the inorganic insulating layer 83.

Next, a silicide layer 94 may be formed on a the first portion of the metal pad 91a using plasma processes that include silane group gases containing silicon (Si), wherein the silane group gases may be one of $SiH_4$, $Si_2H_6$, and $Si_3H_8$. The plasma processes may be performed at a power of about 100 Watts or less, a pressure of about 110 Pa or less, a temperature of about 250° C. to about 500° C., and a gas flow of about 100 SCCM or less. At a gas flow of about 400 SCCM or less, $H_2$ is required.

In FIG. 9D, a transparent conducting oxide (TCO) may be deposited on an entire surface of the organic insulating layer 93 including the contact hole 95, and may be selectively patterned, thereby forming a pad terminal 96 in the contact hole 95 such that the organic insulating layer 93 is adjacent to the contact hole 95. In addition, portions of the pad terminal 96 may be provided along peripheral portions of the contact hole 95 on adjacent portions of the organic insulating layer 93. Accordingly, the pad terminal 96 may be formed to indirectly contact the metal pad 91a through the silicide layer 94.

Although not shown, additional processes may be included between the process steps for forming the inorganic insulating layer 92 and the organic insulating layer 93. For example, an amorphous silicon material containing pure amorphous silicon (a-Si) material and impurities may be deposited on the transparent substrate 90, thereby forming a semiconductor layer that includes the amorphous silicon and impurity amorphous silicon. Then, the semiconductor layer may be selectively patterned for forming an island-shaped active layer above the gate electrode.

Next, a conductive metal, such as chrome Cr, molybdenum Mo, tungsten W, titanium Ti, tantalum Ta or a conductive metal alloy, may be deposited on an entire surface of the transparent substrate 90 including the active layer. Then, the plasma process using the silane group gas containing the silicon Si may be performed on the conductive metal for forming the silicide layer. At this time, the plasma process may be performed using the same conditions previously described above.

During the patterning process, a data line may be formed perpendicular to the gate line, a data pad may be formed at one end of the data line, and a source electrode that protrudes from the data line may be formed above the gate electrode to overlap a first side of the active layer. Accordingly, the inorganic insulating layer 92 may be interposed between the gate and data lines.

During formation of the data line, a drain electrode may be formed spaced apart from the source electrode to overlap with a second side of the active layer. Then, a storage upper electrode may be formed within a storage capacitor region of an adjacent gate line, wherein the storage capacitor region includes a storage lower electrode.

In addition, the contact line of FIG. 6, and the method of fabricating a contact line of FIGS. 9A to 9D may be applicable to a contact portion between a data pad terminal and a data pad at one end of the data line, a contact portion between the storage upper electrode and a pixel electrode, and a contact portion between the drain electrode and the pixel electrode, as well as the contact portion between a gate pad terminal and a gate pad at one end of the gate line. For example, the contact hole 95 may be simultaneously formed on the silicide layer of the data pad, the storage upper electrode, and the drain electrode. In addition, when forming the pad terminal, the pixel electrode within the pixel region may be formed during formation of the data pad terminal on the data pad. Accordingly, the data pad may indirectly contact the data pad terminal through the silicide layer, and the storage upper electrode and the drain electrode may indirectly contact the pixel electrode through the silicide layer.

It will be apparent to those skilled in the art that various modifications and variations can be made in the contact line of a liquid crystal display device and method of fabricating a contact line of a liquid crystal display device of the present invention without departing from the spirit or scope of the invention. Thus, it is intended that the present invention covers the modifications and variations of this invention provided they come within the scope of the appended claims and their equivalents.

What is claimed is:

1. A method of fabricating a contact line structure for a liquid crystal display device, comprising:
   depositing a metal material on an array substrate;
   forming a metal line on an array substrate by etching the metal material;
   forming a silicide layer on the metal line in direct contact with upper and side surfaces of the metal line and the silicide layer is formed in a different layer from the metal line;
   forming an insulating layer having a contact hole exposing a first portion of the silicide layer; and
   forming a transparent conducting terminal in and on the contact hole,
   wherein the insulating layer is adjacent to the contact hole.

2. The method according to claim 1, wherein the steps of forming the metal line and the silicide layer include:
   depositing a metal material on the array substrate;
   forming the suicide layer on the metal material; and
   forming the metal line by etching the silicide layer and the metal material.

3. The method according to claim 1, wherein the steps of forming the metal line and the silicide layer include:
   depositing a metal material on the array substrate;
   forming the metal line by etching the metal material; and
   forming the silicide layer to cover the first portion of the metal line.

4. The method according to claim 1, wherein the step of forming the silicide layer is performed before the step of forming an insulating layer.

5. The method according to claim 1, wherein the metal line includes one of chrome Cr, molybdenum Mo, tungsten W, titanium Ti, tantalum Ta, and a conductive metal alloy.

6. The method according to claim 1, wherein the step of forming a silicide layer includes a plasma process using a silane group gas containing silicon.

7. The method according to claim 6, wherein the plasma process is performed at a power of about 100 Watt or less, a pressure of about 110 Pa, a temperature of about 250° C. to about 500° C., and a gas flow of about 100 SCCM or less.

8. The method according to claim 6, wherein the silane group gas is one of $SiH_4$, $Si_2H_6$, and $Si_3H_8$.

9. The method according to claim 1, wherein the insulating layer includes one of an organic insulating material group containing Benzocyclobutene (BCB) or a photo-acrylic resin.

10. The method according to claim 1, wherein the transparent conducting terminal includes a transparent conducting oxide.

11. The method according to claim 1, wherein the step of forming a metal line includes simultaneous steps of forming a gate line arranged along a first direction on the array substrate, forming a gate electrode protruding from the gate line, and forming a storage lower electrode in a storage capacitor region of an adjacent gate line.

12. The method according to claim 11, further comprising:
   forming a gate insulating layer on the gate electrode;
   forming an active layer on the gate insulating layer above the gate electrode;
   forming a data line perpendicular to the gate line to define a pixel region;
   simultaneously forming a data pad at one end of the data line, and forming a source electrode above the gate electrode to overlap with a first side of the active layer when forming the data line; and
   simultaneously forming a drain electrode to overlap a second side of the active layer at a fixed interval apart from the source electrode, and forming the storage upper electrode in the storage capacitor region of the adjacent gate line when forming the data line.

13. The method according to claim 1, wherein the transparent conducting terminal is a gate pad terminal.

14. The method according to claim 13, wherein the step of forming a gate pad terminal includes simultaneously forming a data pad terminal and a pixel electrode.

* * * * *